July 11, 1939.  J. REUTHER  2,165,653

POTATO DIGGER

Filed March 30, 1937  2 Sheets-Sheet 1

Inventor,
John Reuther,
by Walter P. Geyer
Attorney.

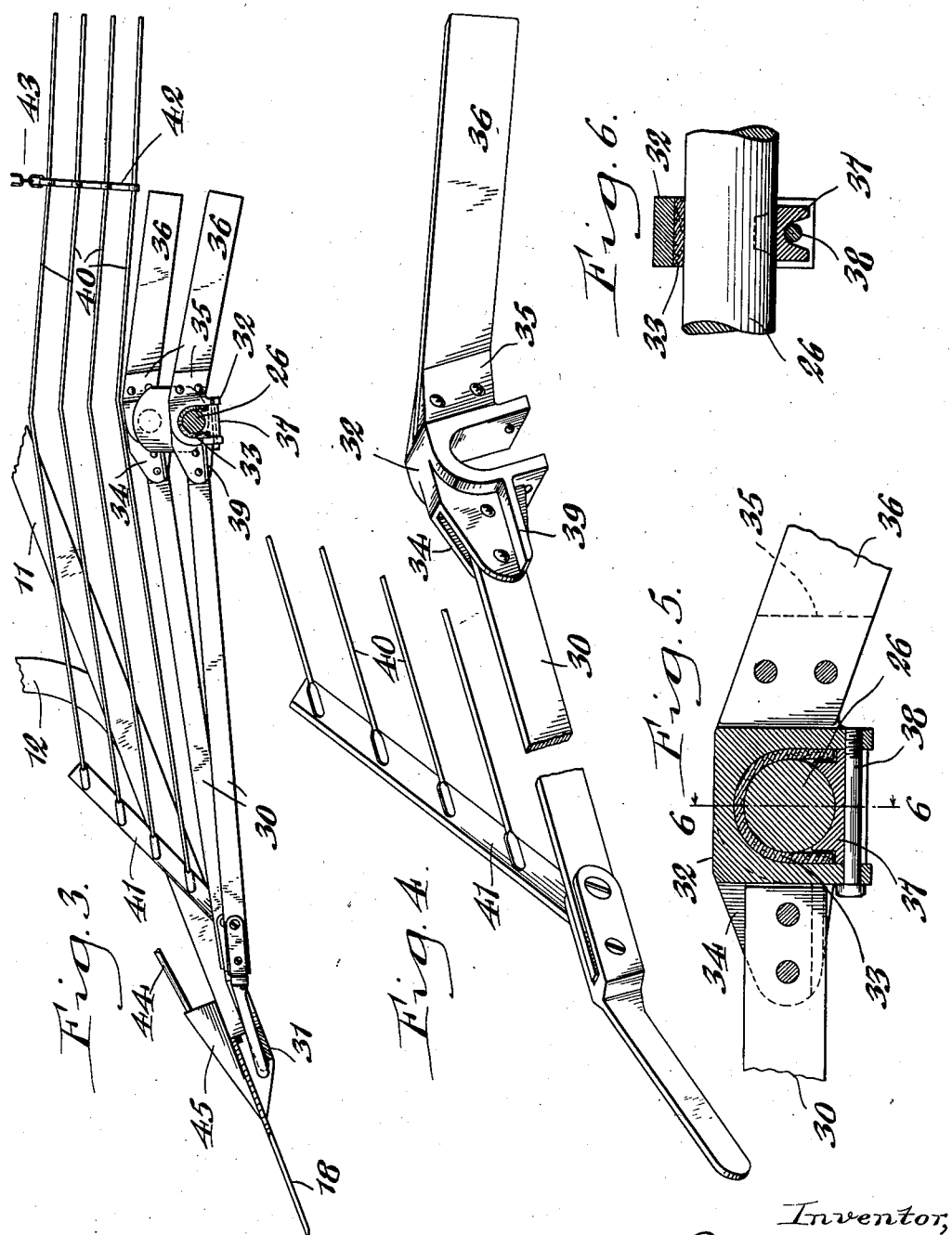

Patented July 11, 1939

2,165,653

UNITED STATES PATENT OFFICE 2,165,653

POTATO DIGGER

John Reuther, East Aurora, N. Y.

Application March 30, 1937, Serial No. 133,797

9 Claims. (Cl. 55—141)

This invention relates to certain new and useful improvements in potato diggers.

It has for one of its objects to provide a potato digger of the type including a plow and a separator mechanism, and to so design the separator mechanism as to provide for a maximum agitating and separating action as well as to provide for the effectual release and displacement of stones and the like to prevent the clogging of such mechanism.

Another object of the invention is the provision of a potato digger which is simple, compact and inexpensive in construction, which is reliable and efficient in operation, and whose parts are so designed and organized as to effectually operate in stony soil.

In the accompanying drawings:—

Figure 1:
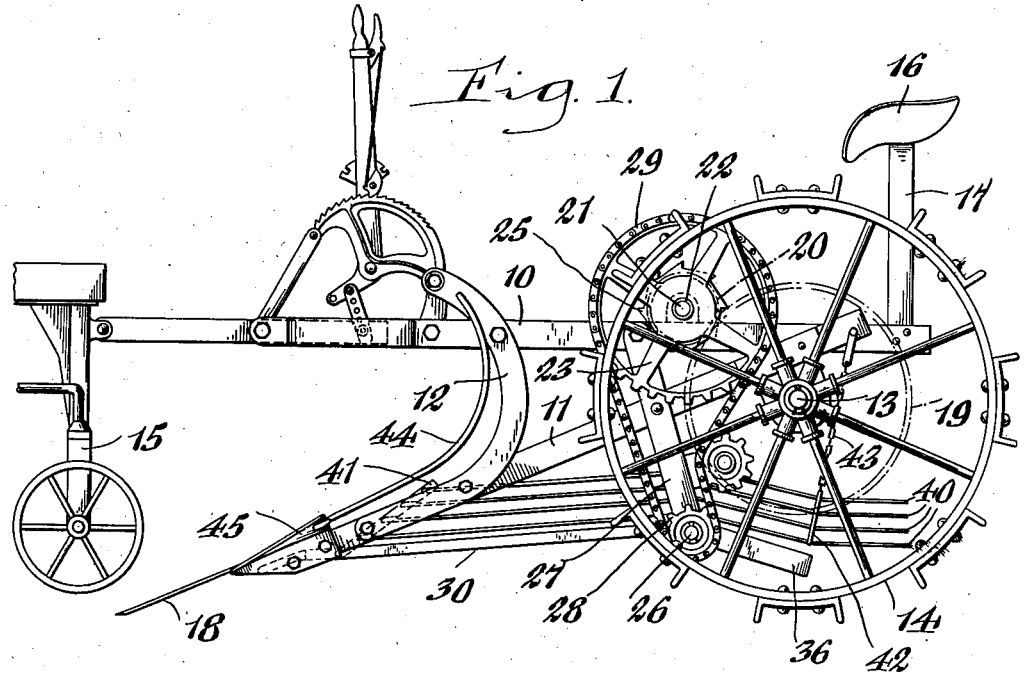
Figure 2:
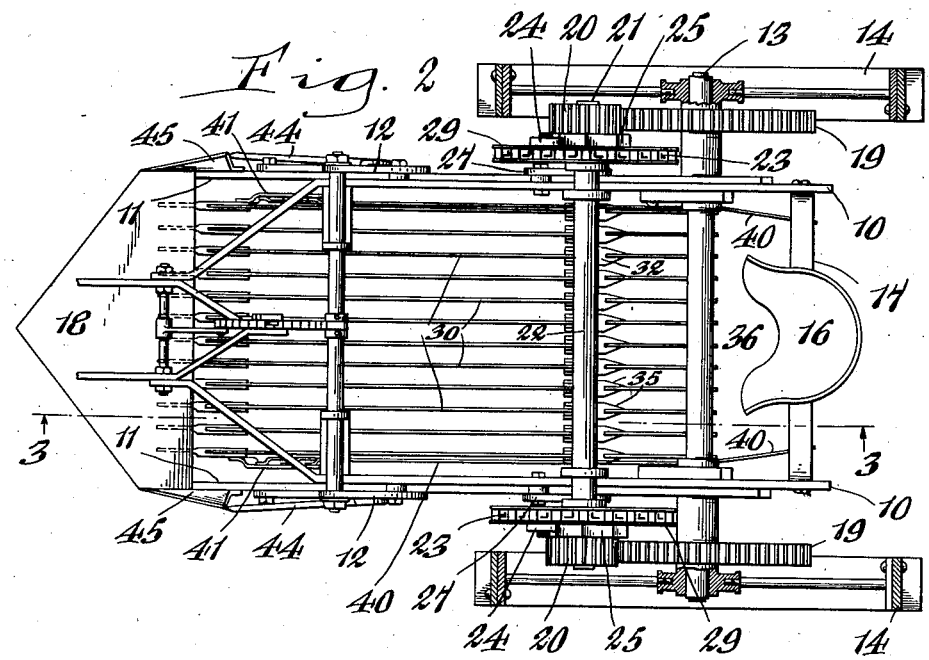

Figure 1 is a side elevation of a potato digger embodying my invention. Figure 2 is a top plan view thereof, partly in section. Figure 3 is an enlarged, fragmentary longitudinal section taken substantially in the plane of line 3—3, Figure 2. Figure 4 is an enlarged perspective view of one of the separator bars and a portion of the adjoining side wall of the digger. Figure 5 is an enlarged, fragmentary longitudinal section of one of the separator bars showing the bearing structure thereof. Figure 6 is a cross section taken on line 6—6, Figure 5.

Similar characters of reference indicate corresponding parts throughout the several views.

The frame of the machine comprises horizontal side bars 10, forwardly inclined side bars 11 fastened at their rear ends to the corresponding ends of the latter, and substantially arcuate shaped brace bars 12 connecting the forward ends of both sets of side bars. This frame is supported at its rear end on the axle 13 to which the traction wheels 14 are fixed in the usual manner, while the front end of the frame is supported on the customary draft truck 15. At its rear end, the machine has a seat 16 applied to a supporting yoke 17, and at its front end there is provided the usual pointed plow 18 suitably fastened to the front ends of the inclined side bars 11.

Fixed adjacent the opposite ends of the axle 13 are gear wheels 19 which mesh constantly with pinions 20 fixed on the ends of a transverse counter shaft 21 disposed forwardly of the axle and extending through a hollow shaft 22 suitably supported on the machine frame. Sprocket wheels 23 are loosely mounted on the shaft 21 and each carries a clutch dog 24 for engagement with a ratchet 25 formed on the companion pinion 20. A crank shaft 26 is arranged in the lower rear end of the machine in front of the axle 13 and is journaled in bearings applied to the lower ends of supporting arms 27 depending from the frame bars 10, 11. Mounted on the ends of this crank shaft are sprocket wheels 28 around which, and the sprocket wheels 23, sprocket chains 29 pass. The sprockets 28 may be of different diameters for varying the speed of rotation of the crank shaft which directly controls the movements of the separator bars or elements 30. When a comparatively slow speed is desired to be imparted to the separator, as for digging in dry ground, the drive is from that side of the machine on which the larger sprocket 28 is located, and to this end the companion sprocket 23 is coupled with the respective drive pinions 20 through the medium of its clutch dog 24. For a faster speed, as when digging in wet ground, the drive is taken from the smaller sprocket on the opposite side of the machine in the same manner.

The separator bars 30 are disposed rearwardly of the plow and receive the material dug up by the plow and serve to separate the potatoes from the earth, vines and other foreign material. These bars are disposed lengthwise of the machine in parallel relation, they are preferably made of spring steel, and as shown in Figures 1 and 2, extend from the discharge end of the plow to a point adjacent and below the axle 13. These separator bars are so suspended that during the travel of the machine over the ground, an up and down and back and forth pitching motion is imparted to them, and for this purpose they are attached near their rear ends to suitable bearings applied to the crank shaft 26, while their front ends are supported and guided for reciprocating motion in a substantially horizontal plane on a transverse guide member or bar 31 which may be conveniently attached to the underside of the plow 18 adjacent its rear end, the front ends of these separator bars resting by gravity on the guide member and being free to slide thereon. The front ends of the separator bars are inclined, as shown, whereby a slight vertical displacement is imparted to them during reciprocation to effect a better separation and tend to pitch the material rearwardly. Each of the separator bars' crank shaft-engaging bearings, as shown in Figures 3–6, inclusive, preferably consists of a substantially U-shaped body or sleeve 32 carrying a like shaped bushing 33. This bearing body is disposed adjacent the rear end of each separator bar 30 and for this purpose is provided at its front side with a bifurcated ear 34 to which the adjoining end of the separator bar is riveted or otherwise fastened, while extending from the rear side thereof is a bifurcated ear 35 to which the rear end of tail extension 36 of the separator bar is riveted or otherwise fastened. The bearing member of each separator bar is fastened to the crank shaft through the medium of a bearing block 37 fitted in the lower end of the bearing body and clamping screw 38 applied to the depending sides of the bearing body and bearing against the underside of the block 37.

The bearing bodies 32 of the separator bars are so designed as to effectually prevent stones and like matter from becoming wedged between the separator bars and the flanges of the crank shaft. For this purpose, each bearing body is provided at its front side with substantially horizontal ribs 39 which extend from the opposite sides of the bifurcated ear 34 and are disposed in a plane substantially intersecting the lower edge of the separator bar 30. The bifurcated ear 35, extending from the rear side of each bearing body, has its opposite sides tapered or converged inwardly in the manner shown in Figures 2 and 4. By this construction, any stones lodging on the separator bars or between the latter and the crank shaft flanges are effectually released as they encounter the ribbed and tapered portions of the bearing members 32, the horizontal ribs 39 acting in the oscillating vertical planes of the bars 30 to release the stones, while the tapered portions of the ears 35 act during the longitudinal displacement of the bars to displace the stones rearwardly, that is, as one bar moves forwardly the tapered sides of the ears 35 act to release any stone rearwardly during the backward movement of an adjoining bar. In the case of the ribs 39, as each bar and crank shaft flange travels upwardly and an adjoining bar and crank flange downwardly, the ribs act to displace the stones vertically, either up or down, and thereby free the stone. On the upstroke of a given separator bar, any stone intercepted by the rib 39 is delivered over and to the rear of the crank shaft, while on the downstroke of any separator bar the stone is displaced downwardly.

At the opposite sides of the separating deck composed of the bars 30, are side walls which are so designed as to move in the same general path as the separator bars and are of a structure to facilitate the entry of the vines, weeds, etc., into the separating deck of the machine as it travels over the ground as well as aid in the separation of the earth, vines and weeds. For this purpose, these side walls are skeleton-like in form and preferably consist of side rods 40 disposed in spaced parallel relation one above the other and fastened at their front ends to an attaching plate 41 connected at its lower end to the outermost separating bars 30 at a point adjacent the front end thereof, while the rear ends of the side wall rods 40 are connected to a coupling member 42 suspended by a chain or other flexible connection 43 with one of the frame bars 10 or 11 of the machine. By this construction and being connected to one of the separator bars 30, the respective side walls 40 are imparted a motion similar to that transmitted to the separator bars and effectually act to facilitate the entry of the vines, weeds, etc., into the machine as well as to facilitate the outward displacement and lateral separation of the earth, vines, weeds, etc., through the openings provided by the spaced side wall rods 40.

Disposed at the front end of the machine, immediately to the rear of the plow 18 and at opposite sides thereof are curved guide rods or members 44 which are suitably anchored at one end to guide plates 45 located at opposite sides of the plow and at their opposite ends to the brace bars 12. These guide rods serve to direct the vines rearwardly and smoothly onto the separator bars 30.

I claim as my invention:—

1. In a potato digger, the combination of a frame, a plow, a plurality of separator bars arranged lengthwise of said frame to the rear of the plow, crank means for individually imparting a vibrating movement to said separator bars, and spaced elements constituting side walls disposed at the opposite sides of said frame and operatively connected to the adjoining outermost separator bars for movement therewith.

2. In a potato digger, the combination of a frame, a plow, a plurality of separator bars arranged lengthwise of said frame to the rear of the plow, means for individually imparting a vibrating movement to said separator bars, and open-sided walls disposed at the opposite sides of said frame and operatively connected to and rising above the adjoining outermost separator bars to vibrate therewith, each of said walls having a connection at one end to the companion separator bar and a suspension connection at its opposite end to said frame.

3. In a potato digger, the combination of a frame, a plow, a plurality of separator bars arranged lengthwise of said frame to the rear of the plow, means for individually imparting a vibrating movement to said separator bars, and side walls disposed at the opposite sides of said frame and including spaced elements operatively connected to the adjoining outermost separator bars to vibrate therewith, each side wall having a connection at its lower front end to the companion separator bar and a flexible connection at its upper rear end to the frame.

4. In a potato digger, the combination of a frame, a plow, a plurality of separator bars arranged lengthwise of said frame to the rear of the plow, crank means for individually imparting a vibrating movement to said separator bars, and side walls disposed at the opposite sides of said frame and each operatively connected at one end to the adjoining outermost separator bars for simultaneous movement therewith and flexibly connected at its other end to said frame.

5. In a potato digger, the combination of a frame, a plow, a crank shaft mounted on said frame, a plurality of separator bars arranged lengthwise of said frame and journaled on said crank shaft, and means extending laterally from said bars fore and aft of the crank shaft and extending in substantially horizontal and convergent vertical planes, for intercepting stones and like materials for displacing them in both vertical and horizontal directions.

6. In a potato digger, the combination of a frame, a plow, a crank shaft mounted on said frame, a plurality of separator bars arranged lengthwise of said frame and journaled on said crank shaft, means extending laterally from said bars fore and aft of the crank shaft for intercepting stones and like materials for displacing them in both vertical and horizontal directions, those portions of the means disposed forwardly of the crank shaft including substantially horizontal ribs to displace intercepted stones downwardly or upwardly in response to the vertical oscillations of the separator bars, and those portions of such means disposed to the rear of the crank shaft being tapered toward the opposite faces of the respective separator bars to effect a rearward displacement of intercepted stones in response to the alternate fore and aft movements of the separator bars.

7. In a potato digger, the combination of a frame, a plow, a crank shaft mounted on said frame, a plurality of separator bars arranged lengthwise of said frame, and bearing members applied to said bars intermediate their ends and engaging said crank shaft, said bearing members including forwardly and rearwardly extending ears the front ears having laterally-extending ribs thereon and the rear ears having their exterior faces tapering toward the contiguous faces of said bars.

8. In a potato digger, the combination of a frame, a plow, a crank shaft mounted on said frame, a plurality of separator bars arranged lengthwise of said frame and journaled on said crank shaft, means extending laterally from said bars fore and aft of the crank shaft for intercepting stones and like materials for displacing them in both vertical and horizontal directions, and side walls disposed at opposite sides of said frame and including spaced elements operatively connected to the adjoining outermost separator bars to vibrate therewith.

9. In a potato digger, the combination of a frame, a plow, a plurality of separator bars arranged lengthwise of said frame to the rear of the plow, a crank shaft operatively connected to said bars for actuating them, and means on said bars adjoining the crank arms of the crank shaft for intercepting stones and like materials and preventing their being lodged between said arms and said bars, said means consisting of substantially horizontal portions at one side of the crank shaft axis extending laterally from the opposite faces of the separator bars to displace the stone vertically, and rearwardly-converging portions at the opposite side of the shaft-axis to displace the intercepted stone rearwardly in response to the relative bar movements.

JOHN REUTHER.